United States Patent
McShane et al.

(10) Patent No.: US 11,171,857 B2
(45) Date of Patent: Nov. 9, 2021

(54) IDENTIFYING AN ELECTRONIC DEVICE CONNECTED TO A COMMUNICATION NETWORK THAT HAS XCP ENABLED

(71) Applicant: Robert Bosch GmbH, Stuttgart (DE)

(72) Inventors: John McShane, Waterford, MI (US); Timothy S. Arntson, Ypsilanti, MI (US); Lena Jokanovic, Belgrade (RS); Douglas Gordon, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/706,219

(22) Filed: Dec. 6, 2019

(65) Prior Publication Data

US 2021/0176156 A1 Jun. 10, 2021

(51) Int. Cl.
*H04L 12/26* (2006.01)
*G06F 3/06* (2006.01)
*H04L 29/08* (2006.01)
*G06F 13/42* (2006.01)
*H04L 12/40* (2006.01)

(52) U.S. Cl.
CPC .............. *H04L 43/50* (2013.01); *G06F 3/061* (2013.01); *G06F 3/0655* (2013.01); *G06F 3/0673* (2013.01); *G06F 13/4282* (2013.01); *H04L 43/0811* (2013.01); *H04L 69/325* (2013.01); *G06F 2213/0042* (2013.01); *H04L 12/40* (2013.01)

(58) Field of Classification Search
CPC .......... H04L 67/12; H04L 2012/40215; H04L 2209/84; G07C 2205/02; G07C 5/0816; G06F 13/36; G06F 13/38
See application file for complete search history.

(56) References Cited

U.S. PATENT DOCUMENTS

| | | | | |
|---|---|---|---|---|
| 5,469,150 A | * | 11/1995 | Sitte | G05B 19/054 340/3.42 |
| 7,272,750 B2 | * | 9/2007 | Sirbu | G06F 11/2257 709/224 |
| 2019/0020717 A1 | * | 1/2019 | Carlesimo | H04L 12/40169 |
| 2019/0041933 A1 | * | 2/2019 | Asano | G06F 1/26 |
| 2019/0173952 A1 | * | 6/2019 | Tauchi | H04L 67/2819 |
| 2019/0268420 A1 | * | 8/2019 | Acharya | H04L 63/0823 |

* cited by examiner

*Primary Examiner* — Tom Y Chang

(74) *Attorney, Agent, or Firm* — Michael Best & Friedrich LLP

(57) ABSTRACT

A system for identifying an electronic device connected to a communication network that has XCP enabled. The system includes, in one example, a communication network, a plurality of electronic devices, and a testing device. The testing device includes an electronic processor. The electronic processor is configured to send a XCP connect message via the communication network. When a first response is received in response to the first XCP connect message, the electronic processor determines that one or more of the plurality of electronic devices have XCP enabled. For each electronic device included in the plurality of electronic devices, the electronic processor is configured to send a reset command to the electronic device, resend the XCP connect message to the plurality of electronic devices, and, when a second response is not received in response to the resent XCP connect message, determine that the electronic device has XCP enabled.

12 Claims, 4 Drawing Sheets

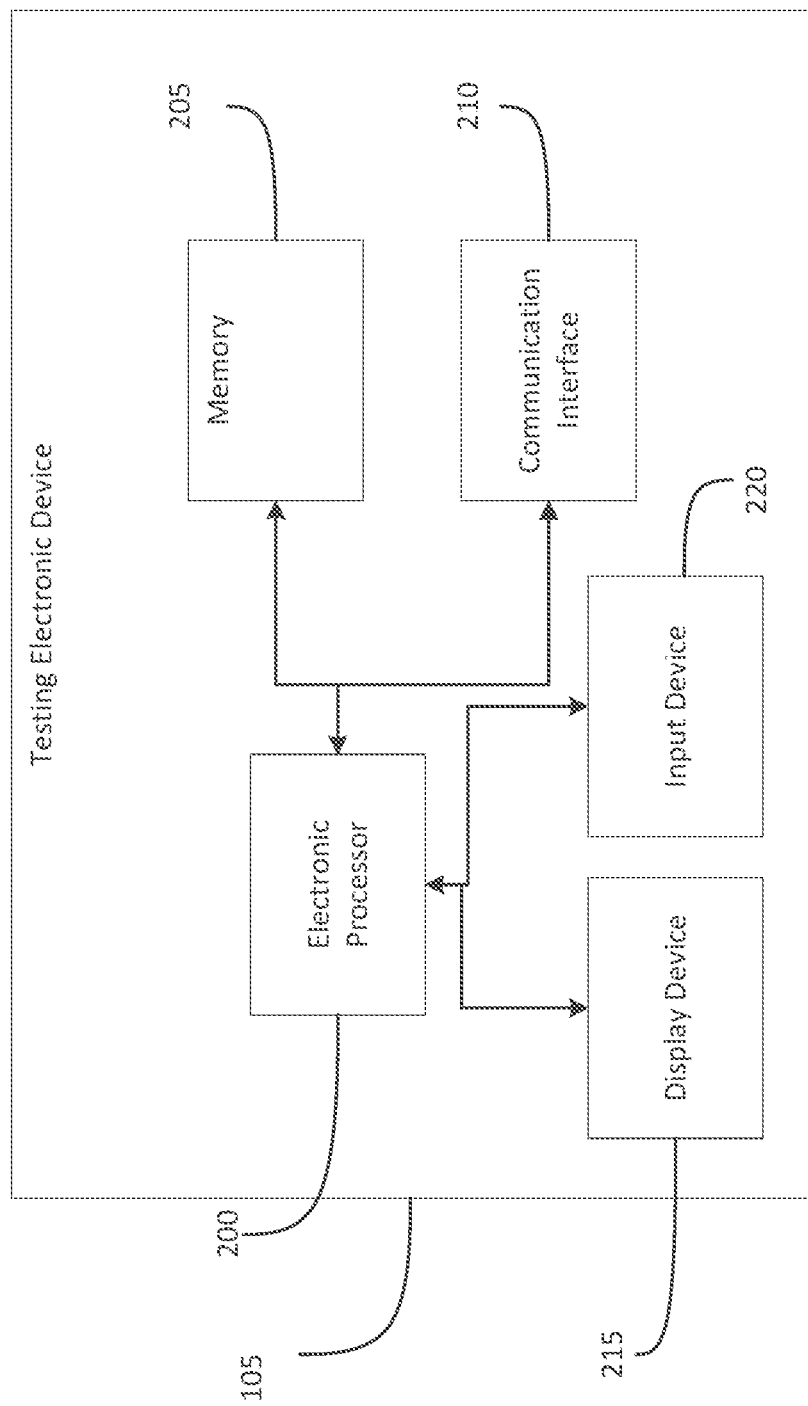

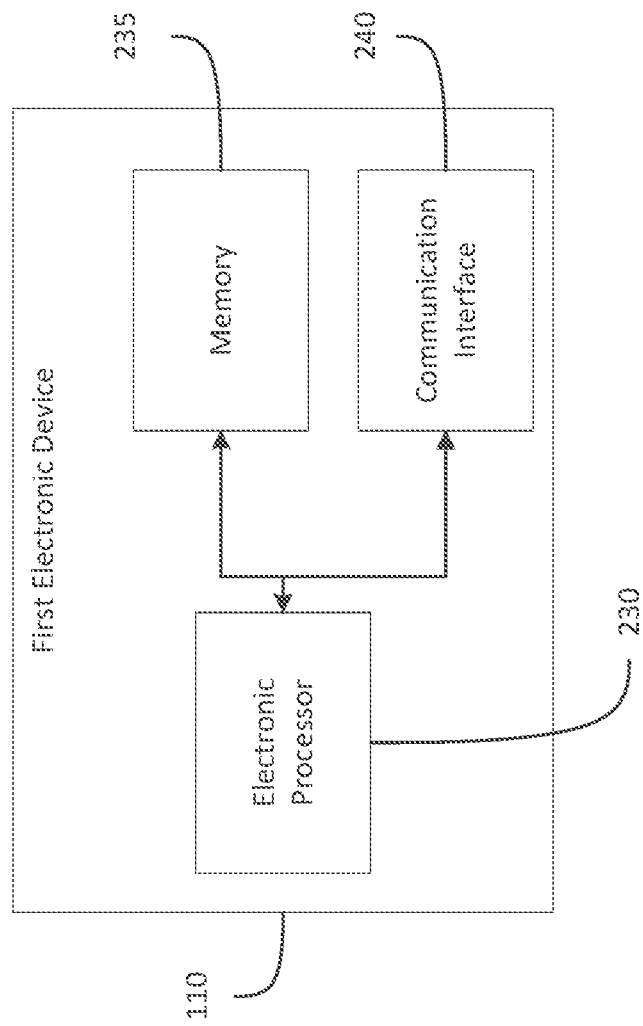

IDENTIFYING AN ELECTRONIC DEVICE CONNECTED TO A COMMUNICATION NETWORK THAT HAS XCP ENABLED

BACKGROUND

Passenger cars and other modern vehicles include sophisticated computer networks. When electronic control units (ECUs) connected via a communications or computer network are configured for operation within a vehicle, Universal Measurement and Calibration Protocol (XCP) is enabled. XCP is a network protocol for connecting calibration systems to ECUs that enables read and write access to variables and memory contents of microcontroller systems of the ECUs at runtime. An ECU or electronic device with XCP enabled has an XCP slave/master ID (XCP identifier) that it listens for. XCP should be disabled before the vehicle is put into production to prevent recalibration of ECUs or electronic devices after it leaves production.

SUMMARY

There does not currently exist a system for efficiently and reliably determining which ECUs connected to a communication network have XCP enabled when multiple ECUs are connected to the communication network. Currently, in order to determine which ECU connected to a communication network has XCP enabled, ECUs must be manually switched off and tested. Alternatively, XCP identifiers must be manually matched to ECU identifiers used in service by a tester using a lookup table. Embodiments described herein provide a system and method for identifying an electronic device connected to a communication network that has XCP enabled with requiring a manual assessment of information in a lookup table or a physical disconnection of an electronic device from a power source.

One embodiment provides an example system for identifying an electronic device connected to a communication network that has XCP enabled. The system includes a communication network and a plurality of electronic devices and a testing device connected via the communication network. The testing device includes an electronic processor. The electronic processor is configured to send a XCP connect message, via the communication network, to the plurality of electronic devices connected to the communication network. When a first response including one or more XCP identifiers is received in response to the first XCP connect message, the electronic processor determines that one or more of the plurality of electronic devices have XCP enabled. For each electronic device included in the plurality of electronic devices, the electronic processor is configured to send a reset command to the electronic device, resend the XCP connect message to the plurality of electronic devices, and, when a second response including one or more XCP identifiers is not received in response to the resent XCP connect message, determine that the electronic device has XCP enabled.

Another embodiment provides an example method of identifying an electronic device connected to a communication network that has XCP enabled. The method includes sending a XCP connect message, via a communication network, to a plurality of electronic devices connected to the communication network. The method also includes determining that one or more of the plurality of electronic devices have XCP enabled when a first response including one or more XCP identifiers is received in response to the first XCP connect message. The method further includes, for each electronic device included in the plurality of electronic devices, sending a reset command to the electronic device, resending the XCP connect message to the plurality of electronic devices, and, when a second response including one or more XCP identifiers is not received in response to the resent XCP connect message, determining that the electronic device has XCP enabled.

Other aspects, features, and embodiments will become apparent by consideration of the detailed description and accompanying drawings.

BRIEF DESCRIPTION OF THE DRAWINGS

FIG. 2A is a block diagram of the testing device of the system of FIG. 1 according to one embodiment.

FIG. 2B is a block diagram of a first electronic device of the system of FIG. 1 according to one embodiment.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
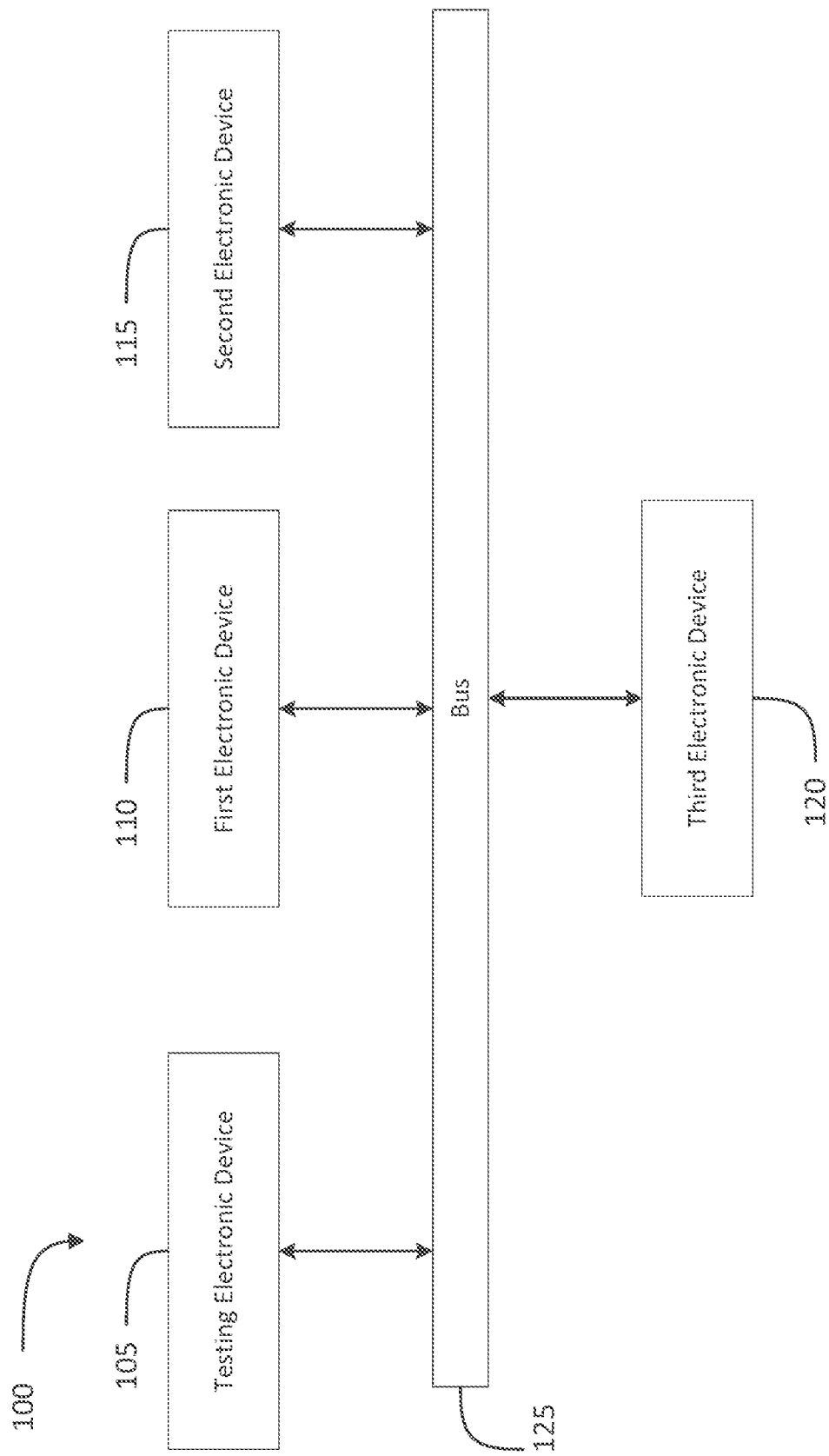
FIG. 1 is a block diagram of a system for identifying an electronic device connected to a communication or computer network that has XCP enabled according to one embodiment.

FIG. 1 illustrates a system 100 for identifying an electronic device connected to a communication network that has XCP enabled. In the example illustrated, the system 100 includes a testing device 105 (which is an electronic device), a first electronic device 110, a second electronic device 115, and a third electronic device 120 (referred to collectively herein as electronic devices 110, 115, 120) connected via a communication network 125. While the communication network 125 is illustrated herein as a bus (for example, a Controller Area Network (CAN) bus), the communication network 125 may be implemented using other network protocols and other network modalities including, for example, Internet Protocol networks, a Universal Serial Bus (USB) network, or Ethernet network. In addition, wireless connections are possible via, for example, short-range wireless networks, such as a Bluetooth™ network, near field communication connections, and combinations or derivatives thereof. The embodiment illustrated in FIG. 1 provides but one example of the components and connections of the system 100. In other embodiments, these components and connections may be constructed in ways other than those illustrated and described herein. For example, the system 100 may include a different number of electronic devices than the four electronic devices illustrated in FIG. 1.

FIG. 2A is a block diagram of an example of the testing device 105 of the system 100 of FIG. 1. The testing device 105 includes a plurality of electrical and electronic components that provide power, operation control, and protection to the components and modules within the testing device 105. The testing device 105 includes, among other things, an electronic processor 200 (such as a programmable electronic microprocessor, microcontroller, or similar device), a memory 205 (for example, non-transitory, computer or machine readable memory), a communication interface 210, a display device 215, and an input device 220. The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a keypad, a mouse, a touchscreen (for example, as part of the display device 215), a microphone, a camera, or the like. The electronic processor 200 is communicatively connected to the memory 205, communication interface 210, display device 215, and input device 220. The electronic processor 200, in coordination with the memory 205 and the communication interface 210, is configured to implement, among other things, the methods described herein. The testing device 105 may contain submodules that include additional electronic processors, memory, or application specific integrated circuits (ASICs) for handling communication functions, processing of signals, and application of the methods listed below. In some embodiments, the testing device 105 includes additional, fewer, or different components. In some embodiments, the functionality described as being performed by the testing device 105 may be distributed among multiple devices.

FIG. 2B is a block diagram of the first electronic device 110 of the system 100 of FIG. 1. The first electronic device 110 includes a plurality of electrical and electronic components that provide power, operation control, and protection to the components and modules within the first electronic device 110. The first electronic device 110 includes, among other things, an electronic processor 230 (such as a programmable electronic microprocessor, microcontroller, or similar device), a memory 235 (for example, non-transitory, computer or machine readable memory), and a communication interface 240. The electronic processor 230 is communicatively connected to the memory 235 and the communication interface 240. The electronic processor 230, in coordination with the memory 235 and the communication interface 240, is configured to implement, among other things, the methods described herein. The first electronic device 110 may contain sub-modules that include additional electronic processors, memory, or application specific integrated circuits (ASICs) for handling communication functions, processing of signals, and application of the methods listed below. In some embodiments, the first electronic device 110 includes additional, fewer, or different components. Although not illustrated herein it should be noted that the second electronic device 115 and third electronic device 120 include components and connections similar to those illustrated in FIG. 2B as being included in the first electronic device 110. Additionally, the second electronic device 115 and third electronic device 120 perform functionality similar to the functionality described herein as being performed by the first electronic device 110.

Figure 3:
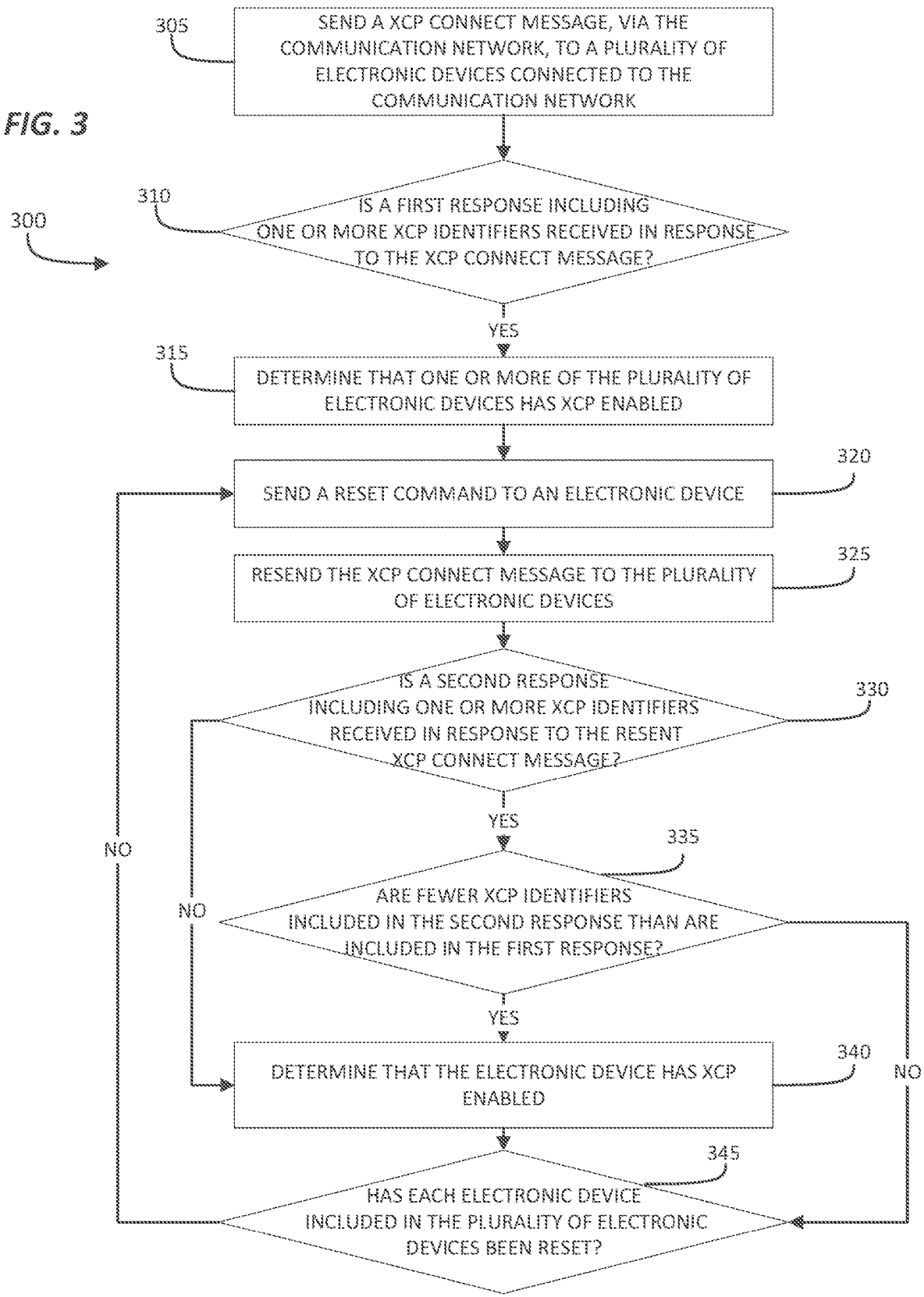
FIG. 3 is a flowchart of a method of using the system of FIG. 1 to identify an electronic device connected to a communication network that has XCP enabled according to one embodiment.

FIG. 3 is a flow chart illustrating an example method 300 of identifying an electronic device connected to a communication network that has XCP enabled. In some embodiments, before the method 300 begins, the electronic processor 200 sends a first message, via the communication network 125, to determine a plurality of electronic devices that are connected to the communication network 125 and are responsive. For example, in the system 100, the electronic processor 200 sends the first message to the first electronic device 110, the second electronic device 115, and the third electronic device 120. The header of the first message includes a global identifier and queries every electronic device connected to the communication network 125. Assuming the electronic devices 110, 115, 120 and communication network 125 are functioning properly, each of the electronic devices 110, 115, 120 receive the first message and send a response message to the electronic processor 200 confirming that they are connected to the communication network 125. For each electronic device that responds to the first message, an identifier associated with the electronic device may be recorded in, for example, a list or similar data structure representing the plurality of electronic devices connected to the communication network 125.

In some embodiments, before the method 300 begins, the electronic processor 200 sends a command via the communication network 125 to silence to silence normal network traffic while the method 300 is performed (for example, if the communication network 125 is a CAN bus, the command silences CAN network messages). Silencing normal network traffic while the method 300 is performed helps to prevent the occurrence of false positives (determining an electronic device has XCP enabled when it does not). In other embodiments, before the method 300 begins, the electronic processor 200 listens to communication on the communication network 125 for a predetermined period of time. The electronic processor 200 records the messages sent on the communication network 125 during the predetermined period of time and ignores the recorded messages if they are sent during the method 300, preventing the occurrence of false positives.

In some embodiments, the method 300 begins at step 305 when the electronic processor 200 sends a XCP connect message, via a communication network (for example, the communication network 125), to the plurality of electronic devices connected to the communication network 125 (for example, the electronic devices 110, 115, 120 or the electronic devices associated with one of the identifiers that were recorded in the list described above). In some embodiments, the payload of the XCP connect message is FF 00 00 00 00 00 00 00.

It should be understood that while described herein as sending a single XCP connect message at step 305, the electronic processor 200 may send a plurality of XCP connect messages. For example, if electronic devices connected to the communication network 125 communicate using 11 bit message identifiers, a XCP connect message may be sent for each value between (0x000-0x7FF), wherein the header of the XCP connect message includes the value.

For example, the header of one XCP connect message may be 0x001, another may be 0x002, another may be 0x003, and so on, up to 0x7FF.

In another example, if electronic devices connected to the communication network 125 communicate using 29 bit message identifiers, the electronic processor 200 may send a XCP connect message for each possible 11 bit value, wherein the first 11 bits of the header of the XCP connect message include the value. When no response is received to XCP connect messages sent for each possible 11 bit value, the electronic processor 200 may send a XCP connect message for each possible 2 byte value (0x0000-0xFFFF), wherein the first two bytes of the header of the XCP connect message includes the value. When no response is received to XCP connect messages sent for each possible 2 byte value, the electronic processor 200 may send a XCP connect message for each possible 3 byte value(0x000000-0xFFFFFF), wherein the first 3 bytes of the header of the XCP connect message include the value.

At step 310, the electronic processor 200 determines whether a first response including one or more XCP identifiers is received in response to the XCP connect message (or plurality of XCP connect messages) and, at step 315, when the first response is received, the electronic processor 200 determines that one or more of the plurality of electronic devices have XCP enabled. It should be understood that the first response may include responses from one or more electronic devices that have XCP enabled.

When the electronic processor 200 determines that one or more of the plurality of electronic devices have XCP enabled, the electronic processor 200 performs steps 320 and 325 for each electronic device included in the plurality of electronic devices. At step 320, the electronic processor 200 sends a reset command to an electronic device of the plurality of electronic devices. The reset command powers down the electronic device that the reset command is sent to for a brief period of time. In some embodiments, the electronic processor 200 determines whether an acknowledgement of reception of the reset command at the electronic device is received and, if no acknowledgement is received, resends the reset command. In some embodiments, the electronic processor 200 may wait a predetermined period of time after sending the reset command or receiving acknowledgement of reception of the reset command before performing step 325.

At step 325, the electronic processor 200 resends the XCP connect message to the plurality of electronic devices. In some embodiments, at step 325, the electronic processor 200 may resend the plurality of XCP connect messages described above with respect to step 305. Regardless of whether the electronic device that the reset command is sent to has XCP enabled, the electronic device will not respond to the resent XCP connect message because the electronic device has been powered down. At step 335, the electronic processor 200 determines whether a second response including one or more XCP identifiers is received in response to the resent XCP connect message (or the plurality of XCP connect messages). If the second response is not received, the electronic processor 200 determines, at step 340, that the electronic device that the reset command was sent to is the only electronic device connected to the communication network 125 that has XCP enabled. In some embodiments, when the second response is not received, the method 300 ends.

When the electronic processor 200 receives the second response, at step 335, the electronic processor 200 determines whether fewer XCP identifiers are included in the second response than are included in the first response. When fewer XCP identifiers are included in the second response than are included in the first response, the electronic processor 200 determines, at step 340, that the electronic device that the reset command was sent to has XCP enabled. It should be understood that, like the first response, the second response may include responses from one or more electronic devices that have XCP enabled.

In some embodiments, the electronic processor 200 may execute steps 325-340 sequentially a predetermined number of times before performing step 345. If the electronic processor 200 determines that the electronic device has XCP enabled based on a response received during the one of the sequential executions of steps 325-340, the electronic processor 200 determines the electronic device has XCP enabled and, in some embodiments, records an identifier associated with the electronic device.

At step 345, the electronic processor 200 determines whether each electronic device of the plurality of electronic devices has been reset. If there are electronic devices included in the plurality of electronic devices that have not been reset, the electronic processor 200 repeats the method 300 starting at step 320 by sending a reset command to an electronic device of the plurality of electronic devices that has not yet been reset.

In some embodiments, as the method 300 is executed, the electronic processor 200 records an identifier associated with each electronic device that has XCP enabled. The electronic processor 200 may display the identifiers of one or more electronic devices that have XCP enabled via the display device 215. Based on the displayed electronic device identifiers, a programmer or system administrator may update the software code or computer readable instructions stored by each electronic device that has its identifier is displayed to disable XCP for the electronic device. In some embodiments, the electronic processor 200 is configured to automatically disable XCP on electronic devices that the electronic processor 200 determines have XCP enabled. In some embodiments, the electronic processor 200 is configured to both automatically disable XCP on electronic devices that the electronic processor 200 determines have XCP enabled and display the identifiers of one or more electronic devices that have XCP enabled via the display device 215.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Thus, the embodiments described herein provide, among other things, a system and a method for identifying an electronic device connected to a communication network that has XCP enabled. Various features and advantages of the embodiments are set forth in the following claims.

What is claimed is:

1. A system for identifying an electronic device connected to a communication network that has XCP enabled, the system comprising:
   a communication network; and
   a plurality of electronic devices and a testing device connected via the communication network, the testing device comprising:
   an electronic processor configured to:
   send a XCP connect message, via the communication network, to the plurality of electronic devices connected to the communication network; and
   when a first response including one or more XCP identifiers is received in response to the first XCP connect message;
      determine that one or more of the plurality of electronic devices have XCP enabled; and
      for each electronic device included in the plurality of electronic devices;
         send a reset command to the electronic device;
         resend the XCP connect message to the plurality of electronic devices; and
         when a second response including one or more XCP identifiers is not received in response to the resent XCP connect message, determine that the electronic device has XCP enabled.

2. The system according to claim 1, wherein the reset command disables the electronic device for a brief period of time.

3. The system according to claim 1, wherein the electronic processor is further configured to
   when the second response including one or more XCP identifiers is received in response to the resent XCP connect message;
      determine whether fewer XCP identifiers are included in the second response than are included in the first response; and
      when fewer XCP identifiers are included in the second response than are included in the first response, determine that the electronic device has XCP enabled.

4. The system of claim 1, wherein the electronic processor is configured to determine the plurality of electronic devices connected to the communication network by
   sending a first message, via the communication network; and
   for each electronic device that responds to the first message, recording an identifier associated with the electronic device in a data structure.

5. The system according to claim 4, wherein a header of the first message includes a global identifier.

6. The system according to claim 1, wherein the electronic processor is configured to disable XCP on an electronic device that has XCP enabled, display an identifier associated with the electronic device that has XCP enabled, or both.

7. A method for identifying an electronic device connected to a communication network that has XCP enabled, the method comprising:
   sending a XCP connect message, via a communication network, to a plurality of electronic devices connected to the communication network; and
   when a first response including one or more XCP identifiers is received in response to the first XCP connect message;
      determining that one or more of the plurality of electronic devices have XCP enabled; and
      for each electronic device included in the plurality of electronic devices;
         sending a reset command to the electronic device;
         resending the XCP connect message to the plurality of electronic devices; and
            when a second response including one or more XCP identifiers is not received in response to the resent XCP connect message, determining that the electronic device has XCP enabled.

8. The method according to claim 7, wherein the reset command disables the electronic device for a brief period of time.

9. The method according to claim 7, wherein the method further comprising
   when the second response including one or more XCP identifiers is received in response to the resent XCP connect message;
      determining whether fewer XCP identifiers are included in the second response than are included in the first response; and
      when fewer XCP identifiers are included in the second response than are included in the first response, determining that the electronic device has XCP enabled.

10. The method of claim 7, wherein the method further comprising
    determining the plurality of electronic devices connected to the communication network by:
    sending a first message, via the communication network; and
    for each electronic device that responds to the first message, recording an identifier associated with the electronic device in a data structure.

11. The method according to claim 10, wherein a header of the first message includes a global identifier.

12. The method according to claim 7, the method further comprising
    disabling XCP on an electronic device that has XCP enabled, displaying an identifier associated with the electronic device that has XCP enabled, or both.

* * * * *